(12) United States Patent
Park et al.

(10) Patent No.: US 11,838,414 B2
(45) Date of Patent: Dec. 5, 2023

(54) APPARATUS AND METHOD FOR RECOVERING ENCRYPTION KEY BASED ON MEMORY ANALYSIS

(71) Applicant: ELECTRONICS AND TELECOMMUNICATIONS RESEARCH INSTITUTE, Daejeon (KR)

(72) Inventors: Tae Hwan Park, Daejeon (KR); Sang Yun Han, Daejeon (KR); Sang Woon Jang, Daejeon (KR); Il Hwan Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 466 days.

(21) Appl. No.: 17/069,084

(22) Filed: Oct. 13, 2020

(65) Prior Publication Data

US 2022/0060324 A1    Feb. 24, 2022

(30) Foreign Application Priority Data

Aug. 20, 2020    (KR) .......................... 10-2020-0104860

(51) Int. Cl.
*H04L 9/08* (2006.01)
*H04L 9/06* (2006.01)
*G06F 3/06* (2006.01)

(52) U.S. Cl.
CPC .......... *H04L 9/0894* (2013.01); *G06F 3/0622* (2013.01); *G06F 3/0655* (2013.01); *G06F 3/0673* (2013.01); *H04L 9/0631* (2013.01)

(58) Field of Classification Search
CPC ... H04L 9/0894; H04L 9/0631; G06F 3/0622; G06F 3/0655; G06F 3/0673
(Continued)

(56) References Cited

U.S. PATENT DOCUMENTS

2017/0223031 A1* 8/2017 Gu ...................... G06F 11/1448
2018/0114020 A1* 4/2018 Hirschberg ........... G06F 21/566
(Continued)

FOREIGN PATENT DOCUMENTS

| KR | 10-1685014 B1 | 12/2016 |
|----|---------------|---------|
| KR | 10-2019-0006429 A | 1/2019 |
| KR | 10-2019-0135752 A | 12/2019 |

OTHER PUBLICATIONS

Felix Grobert et al, "Automated Identification of Cryptographic Primitives in Binary Programs", Conference Paper, 2011.
(Continued)

*Primary Examiner* — Kambiz Zand
*Assistant Examiner* — Phuc Pham
(74) *Attorney, Agent, or Firm* — LRK PATENT LAW FIRM (57) ABSTRACT

An apparatus and method for encryption key recovery based on memory analysis. The apparatus may include one or more processors and executable memory for storing at least one program executed by the one or more processors. The at least one program may collect memory information pertaining to an encrypted part of a file, in which ransomware is detected, based on dynamic binary instrumentation, analyze memory read operation data corresponding to an encryption key that is used for encryption of the file in the memory information, recover the encryption key based on the result of analysis of the memory read operation data, and output the result of recovery of the encryption key.

13 Claims, 9 Drawing Sheets

(58) Field of Classification Search
USPC .......................................................... 380/1
See application file for complete search history.

(56) References Cited

U.S. PATENT DOCUMENTS

| | | | |
|---|---|---|---|
| 2019/0012459 A1 | 1/2019 | Choi et al. | |
| 2019/0018961 A1* | 1/2019 | Kostyushko | H04L 9/002 |
| 2019/0116030 A1* | 4/2019 | Wiacek | H04L 9/0894 |
| 2021/0357505 A1* | 11/2021 | Hong | G06F 21/566 |

OTHER PUBLICATIONS

Amin Kharraz et al, "Cutting the Gordian Knot: A Look Under the Hood of Ransomware Attacks", Conference paper, 2015.

* cited by examiner

```
000000000030c07b, 39 000000000030c06c, 09 0000000ffefffa54,23
000000000030c06d,cf 0000000ffefffa55,a3 000000000030c06e, 4f 0000000ffefffa56,39
000000000003c06f,3c 0000000ffefffa57,39 000000000030c07c,2a
000000000030c07d,6c 000000000030c07e, 76 000000000030c07,05
0000000ffefffa54,2a 0000000ffefffa55,6c 0000000ffefffa56, 76 0000000ffefffa57,05
0000000ffefffa54,6c 0000000ffefffa2c,6c 000000000010a88c,50 0000000ffefffa55,76
0000000ffefffa2c,76 000000000010a896,38 0000000ffefffa56,05 0000000ffefffa2c,05
```

FIG. 6

| | |
|---|---|
| 0xffefffbcf,0xe7,1 | 0xffefffbcf,0xcb,2 |
| 0xffefffbcf,0xe1,1 | 0xffefffbcf,0xc6,1 |
| 0xffefffbcf,0xe0,1 | 0xffefffbcf,0xc5,4 |
| 0xffefffbcf,0xdf,2 | 0xffefffbcf,0xfc,1 |
| 0xffefffbcf,0xdd,1 | 0xffefffbcf,0xf9,1 |
| 0xffefffbcf,0xdc,1 | 0xffefffbcf,0xf8,1 |
| 0xffefffbcf,0xdb,1 | 0xffefffbcf,0xf3,1 |
| 0xffefffbcf,0xd9,1 | 0xffefffbcf,0xf0,1 |
| 0xffefffbcf,0xd8,1 | 0xffefffbcf,0xef,2 |
| 0xffefffbcf,0xd1,1 | 0xffefffbcf,0xee,1 |
| 0xffefffbcf,0xdf,4 | 0xffefffbcf,0xed,1 |
| 0xffefffbcf,0xcd,4 | 0xffefffbcf,0xeb,3 |

FIG. 7

| 0xffefffb8f,0x3c,3 | 0x30c10f,0xa6,3 | 0x30c0ff,0x6e,9 |
|---|---|---|
| 0xffefffb8e,0x4f,3 | 0x30c10e,0xc,3 | 0x30c0fe,0x0,9 |
| 0xffefffb8d,0xcf,3 | 0x30c10d,0x63,3 | 0x30c0fd,0x5c,9 |
| 0xffefffb8c,0x9,3 | 0x30c10c,0xb3,3 | 0x30c0fc,0x57,9 |
| 0xffefffb8b,0x88,3 | 0x30c10b,0xc8,6 | 0x30c0fb,0x41,9 |
| 0xffefffb8a,0x15,3 | 0x30c10a,0xc,6 | 0x30c0fa,0x29,9 |
| 0xffefffb89,0xf7,3 | 0x30c109,0x3f,6 | 0x30c0f9,0xd1,9 |
| 0xffefffb88,0xab,3 | 0x30c108,0xe1,6 | 0x30c0f8,0x28,9 |
| 0xffefffb87,0xa6,3 | 0x30c107,0x89,6 | 0x30c0f7,0x21,9 |
| 0xffefffb86,0xd2,3 | 0x30c106,0x25,6 | 0x30c0f6,0xdc,9 |
| 0xffefffb85,0xae,3 | 0x30c105,0xee,6 | 0x30c0f5,0xfa,9 |
| 0xffefffb84,0x28,3 | 0x30c104,0xc9,6 | 0x30c0f4,0x19,9 |
| 0xffefffb83,0x16,3 | 0x30c103,0xa8,6 | 0x30c0f3,0xf3,9 |
| 0xffefffb82,0x15,3 | 0x30c102,0xf9,6 | 0x30c0f2,0x66,9 |
| 0xffefffb81,0x7e,3 | 0x30c101,0x14,6 | 0x30c0f1,0x77,9 |
| 0xffefffb80,0x2b,3 | 0x30c100,0xd0,6 | 0x30c0f0,0xac,9 |

FIG. 8

| 0xffefffb8f,0x3c,3 | 0x30c077,0xb1,9 |
|---|---|
| 0xffefffb8e,0x4f,3 | 0x30c076,0x2c,9 |
| 0xffefffb8d,0xcf,3 | 0x30c075,0x54,9 |
| 0xffefffb8c,0x9,3 | 0x30c074,0x88,9 |
| 0xffefffb8b,0x88,3 | 0x30c073,0x17,9 |
| 0xffefffb8a,0x15,3 | 0x30c072,0xfe,9 |
| 0xffefffb89,0xf7,3 | 0x30c071,0xfa,9 |
| 0xffefffb88,0xab,3 | 0x30c070,0xa0,9 |
| 0xffefffb87,0xa6,3 | 0x30c06f,0x3c,9 |
| 0xffefffb86,0xd2,3 | 0x30c06e,0x4f,9 |
| 0xffefffb85,0xae,3 | 0x30c06d,0xcf,9 |
| 0xffefffb84,0x28,3 | 0x30c06c,0x9,9 |
| 0xffefffb83,0x16,3 | 0x30c06b,0x88,6 |
| 0xffefffb82,0x15,3 | 0x30c06a,0x15,6 |
| 0xffefffb81,0x7e,3 | 0x30c069,0xf7,6 |
| 0xffefffb80,0x2b,3 | 0x30c068,0xab,6 |

APPARATUS AND METHOD FOR RECOVERING ENCRYPTION KEY BASED ON MEMORY ANALYSIS

CROSS REFERENCE TO RELATED APPLICATION

This application claims the benefit of Korean Patent Application No. 10-2020-0104860, filed Aug. 20, 2020, which is hereby incorporated by reference in its entirety into this application.

BACKGROUND OF THE INVENTION

1. Technical Field

The present invention relates generally to technology for recovering a ransomware encryption key, and more particularly to technology for recovering a ransomware encryption key based on memory analysis.

2. Description of Related Art

Ransomware detection technology is one of conventional ransomware-related technologies, and aims to detect ransomware based on the behavior thereof or using a specific signature based on code. Dynamic binary instrumentation is technology for performing measurement analysis on the operation and behavior of a binary application by inserting execution code into the binary application at runtime. A side-channel attack technique based on differential computation analysis is a technique for recovering an encryption key based on side-channel information (memory information) that is generated when encryption is performed on different pieces of input data.

However, the conventional ransomware-related technologies are focused on detection and prevention of ransomware, rather than recovery of a key that is used for encryption. Also, due to false positives or false negatives in detection of ransomware, users may suffer material and monetary damage. Therefore, in order to minimize damage to users related to long detection times, technology for recovering an encryption key is required.

Meanwhile, Korean Patent Application Publication No. 10-2019-0135752, titled "Method and apparatus for detecting ransomware in file system", discloses a method and apparatus for detecting ransomware in a file system, which are configured to detect ransomware in a computing environment, thereby protecting files in the file system from the threat of encryption of the files.

SUMMARY OF THE INVENTION

An object of the present invention is to provide an apparatus and method for recovering an encryption key and minimizing material and monetary damage incurred by false positives or false negatives in detection of ransomware.

In order to accomplish the above object, an apparatus for encryption key recovery based on memory analysis according to an embodiment of the present invention may include one or more processors and executable memory for storing at least one program executed by the one or more processors. The at least one program may collect memory information pertaining to an encrypted part of a file, in which ransomware is detected, based on dynamic binary instrumentation, analyze memory read operation data corresponding to an encryption key that is used for encryption of the file in the memory information, recover the encryption key based on the result of analysis of the memory read operation data, and output the result of recovery of the encryption key.

Here, the at least one program may collect the memory information of a section between an operation of opening the file and an operation of closing the file.

Here, the at least one program may extract a memory address at which a memory read operation occurs and memory read operation data corresponding thereto from the memory information.

Here, the at least one program may count the number of occurrences of the memory read operation at the memory address.

Here, when memory read operations occur at consecutive memory addresses, the at least one program may extract memory read operation data, acquired through the memory read operations occurring at the consecutive memory addresses, from the memory information.

Here, when the size of the memory read operation data acquired through the memory read operations occurring at the consecutive memory addresses is equal to or greater than a preset size, the at least one program may extract the memory read operation data.

Here, the at least one program may generate a memory read operation data candidate group by including the memory read operation data acquired through the memory read operations occurring at the consecutive memory addresses when the size of the memory read operation data is equal to or greater than the preset size and when the numbers of occurrences of the memory read operations at the consecutive memory addresses are equal to each other.

Here, the at least one program may generate an encryption key candidate group, in which the memory read operation data acquired through the memory read operation is sorted according to the number of occurrences of the memory read operation, based on the memory read operation data candidate group and recover the encryption key based on the encryption key candidate group.

Also, in order to accomplish the above object, a method for encryption key recovery based on memory analysis, performed by an apparatus for encryption key recovery based on memory analysis, according to an embodiment of the present invention may include collecting memory information pertaining to an encrypted part of a file, in which ransomware is detected, based on dynamic binary instrumentation; analyzing memory read operation data, corresponding to an encryption key that is used for encryption of the file, in the memory information; and recovering the encryption key based on the result of analysis of the memory read operation data and outputting the result of recovery of the encryption key.

Here, collecting the memory information may be configured to collect the memory information of a section between an operation of opening the file and an operation of closing the file.

Here, analyzing the memory read operation data may be configured to extract a memory address at which a memory read operation occurs and memory read operation data corresponding thereto from the memory information.

Here, analyzing the memory read operation data may be configured to count the number of occurrences of the memory read operation at the memory address.

Here, analyzing the memory read operation data may be configured such that, when memory read operations occur at consecutive memory addresses, memory read operation data, acquired through the memory read operations occurring at the consecutive memory addresses, is extracted from the memory information.

Here, analyzing the memory read operation data may be configured to extract the memory read operation data acquired through the memory read operations occurring at the consecutive memory addresses when the size of the memory read operation data is equal to or greater than a preset size.

Here, analyzing the memory read operation data may be configured to generate a memory read operation data candidate group by including the memory read operation data acquired through the memory read operations occurring at the consecutive memory addresses when the size of the memory read operation data is equal to or greater than the preset size and when the numbers of occurrences of the memory read operations at the consecutive memory addresses are equal to each other.

Here, outputting the result of recovery of the encryption key may be configured to generate an encryption key candidate group, in which the memory read operation data acquired through the memory read operation is sorted according to the number of occurrences of the memory read operation, based on the memory read operation data candidate group and to recover the encryption key based on the encryption key candidate group.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 1:
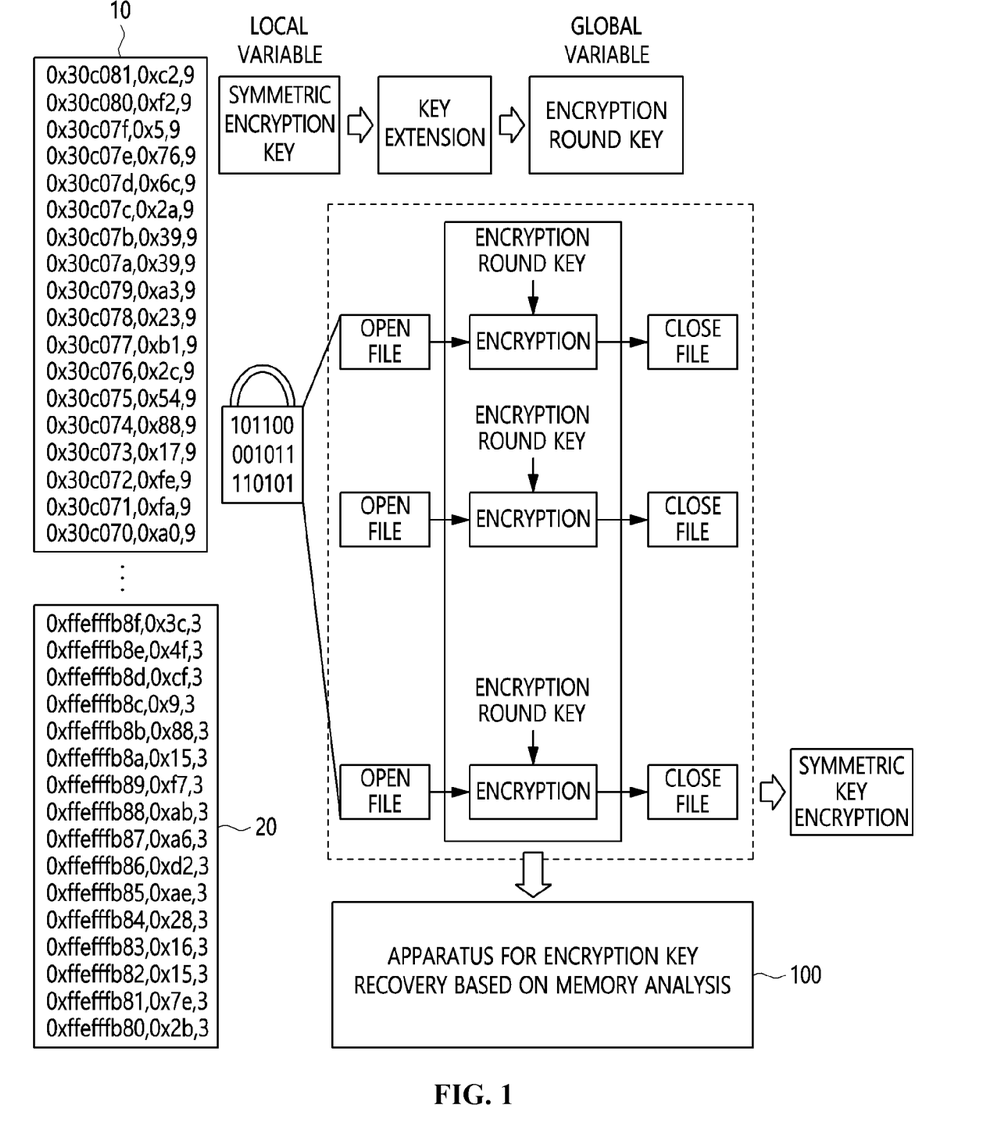
FIG. 1 is a view illustrating a system for encryption key recovery based on memory analysis according to an embodiment of the present invention.

FIG. 1 is a view illustrating a system for encryption key recovery based on memory analysis according to an embodiment of the present invention.

In the system for encryption key recovery based on memory analysis according to an embodiment of the present invention, an apparatus 100 for encryption key recovery based on memory analysis may recover an encryption key that was used in the process of encrypting each file, among ransomware operations.

Here, the apparatus 100 for encryption key recovery based on memory analysis according to an embodiment of the present invention may recognize file open/close operations in the file encryption process.

Here, an encryption master key or a round key may be present in a space having consecutive memory addresses. For example, the encryption master key or the round key may have a size of 16 bytes in accordance with AES-128.

Here, the apparatus 100 for encryption key recovery based on memory analysis according to an embodiment of the present invention may recover an encryption key from a file in which ransomware is detected based on an existing system security function or existing detection technology.

Here, the apparatus 100 for encryption key recovery based on memory analysis according to an embodiment of the present invention may generate a round key candidate group 10 and an encryption master key candidate group 20, and may recover the encryption key based on the round key candidate group 10 and the encryption master key candidate group 20.

Here, the apparatus 100 for encryption key recovery based on memory analysis according to an embodiment of the present invention may collect memory information pertaining to the file in which the ransomware is detected using Dynamic Binary Instrumentation (DBI).

Figure 2:
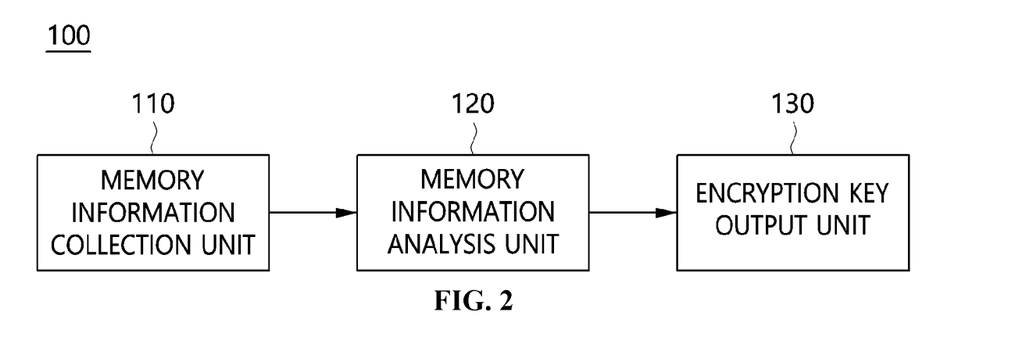
FIG. 2 is a block diagram illustrating an apparatus for encryption key recovery based on memory analysis according to an embodiment of the present invention.

FIG. 2 is a block diagram illustrating an apparatus for encryption key recovery based on memory analysis according to an embodiment of the present invention.

Referring to FIG. 2, the apparatus 100 for encryption key recovery based on memory analysis according to an embodiment of the present invention includes a memory information collection unit 110, a memory information analysis unit 120, and an encryption key output unit 130.

The memory information collection unit 110 may collect memory information pertaining to an encrypted part of a file in which ransomware is detected based on dynamic binary instrumentation.

Here, the memory information collection unit 110 may collect the memory information of a section between the operation of opening the file and the operation of closing the file.

Here, the memory information collection unit 110 may collect instruction information based on the execution of the file in which the ransomware is detected.

Here, when an instruction to open the file is identified in the collected instruction information, the memory information collection unit 110 may collect memory information pertaining to the file, whereas when an instruction to open the file is not identified in the collected instruction information, the memory information collection unit 110 may collect instruction information.

Here, the memory information collection unit 110 may collect instruction information based on the execution of the file in which the ransomware is detected, and may check whether the encryption operation by the ransomware finishes when an instruction to close the file is identified in the collected instruction information. When an instruction to close the file is not identified, the memory information collection unit 110 may continue to collect instruction information.

Here, when termination of the ransomware is identified, the memory information collection unit 110 may request the memory information analysis unit 120 to analyze memory read operation data in the collected memory information. When the ransomware is not terminated, the memory information collection unit 110 may collect memory information.

The memory information analysis unit 120 may analyze memory read operation data corresponding to the encryption key that was used for encryption of the file in the memory information.

Here, the memory information analysis unit 120 may extract a memory address at which a memory read operation occurs and memory read operation data, acquired through the memory read operation, from the memory information.

Here, the memory information analysis unit 120 may output the memory information by repeatedly outputting the memory address and the memory read operation data in the order in which they are listed.

Here, after it counts the number of occurrences of each memory read operation in the memory information, the memory information analysis unit 120 may sequentially output the memory address at which the memory read operation occurs, the memory read operation data acquired through the memory read operation, and the number of occurrences.

Here, the memory information analysis unit 120 may first count the number of occurrences of the memory read operation occurring at the memory address in the memory information.

Here, when memory read operations occurring at consecutive memory addresses are found in the memory information, the memory information analysis unit 120 stores the memory read operation data corresponding thereto. However, when the memory addresses at which the memory read operations occur are not consecutive, the memory information analysis unit 120 may initialize a part corresponding to memory read operation data acquired through the memory read operations in the memory information.

Here, when memory read operations occurring at consecutive memory addresses are found in the memory information, the memory information analysis unit 120 may extract the memory read operation data acquired through the memory read operations.

Here, after it counts the number of occurrences of each of the memory read operations in the memory information, the memory information analysis unit 120 may sequentially output the memory address at which the memory read operation occurs, the memory read operation data acquired through the memory read operation, and the number of occurrences.

Here, when the size of the memory read operation data acquired through the memory read operations occurring at the consecutive memory addresses is equal to or greater than a preset size, the memory information analysis unit 120 may extract the memory read operation data.

Here, the preset size may be 16 bytes, in accordance with AES-128.

Here, the memory information analysis unit 120 may generate a memory read operation data candidate group by including the memory read operation data acquired through the memory read operations occurring at the consecutive memory addresses when the size of the corresponding memory read operation data is equal to or greater than the preset size and when the numbers of occurrences of the memory read operations at the consecutive memory addresses are equal to each other.

Here, when analysis of all the memory read operation data is completed to the end of the memory information, the memory information analysis unit 120 may request the encryption key output unit 130 to recover the encryption key, whereas when the analyzed part does not reach the end of the memory information, the memory information analysis unit 120 may count the number of occurrences of the memory read operation at each memory address.

The encryption key output unit 130 may recover the encryption key based on the result of analysis of the memory read operation data, and may output the result of recovery of the encryption key.

Here, the encryption key output unit 130 may generate an encryption key candidate group, in which the memory read operation data is sorted according to the number of occurrences of the memory read operation corresponding thereto, based on the memory read operation data candidate group, and may recover the encryption key based on the encryption key candidate group.

Here, the encryption key output unit 130 may output the encryption key candidate group in which the memory read operation data, acquired through each of the memory read operations occurring the same number of times at the consecutive memory addresses, is sorted.

Here, the encryption key output unit 130 may output the encryption key candidate group by sequentially outputting the memory address at which the memory read operation occurs, the memory read operation data, and the number of occurrences.

Figure 3:
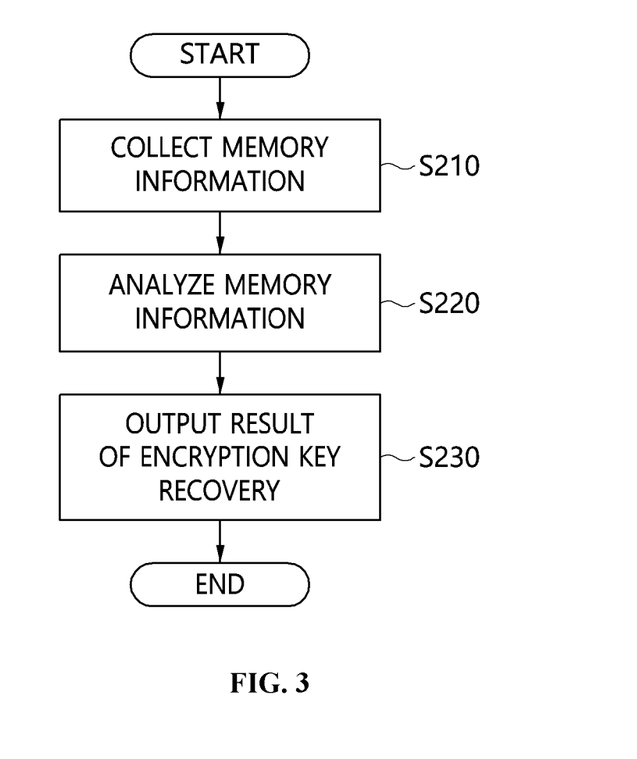
FIG. 3 is a flowchart illustrating a method for encryption key recovery based on memory analysis according to an embodiment of the present invention.
Figure 4:
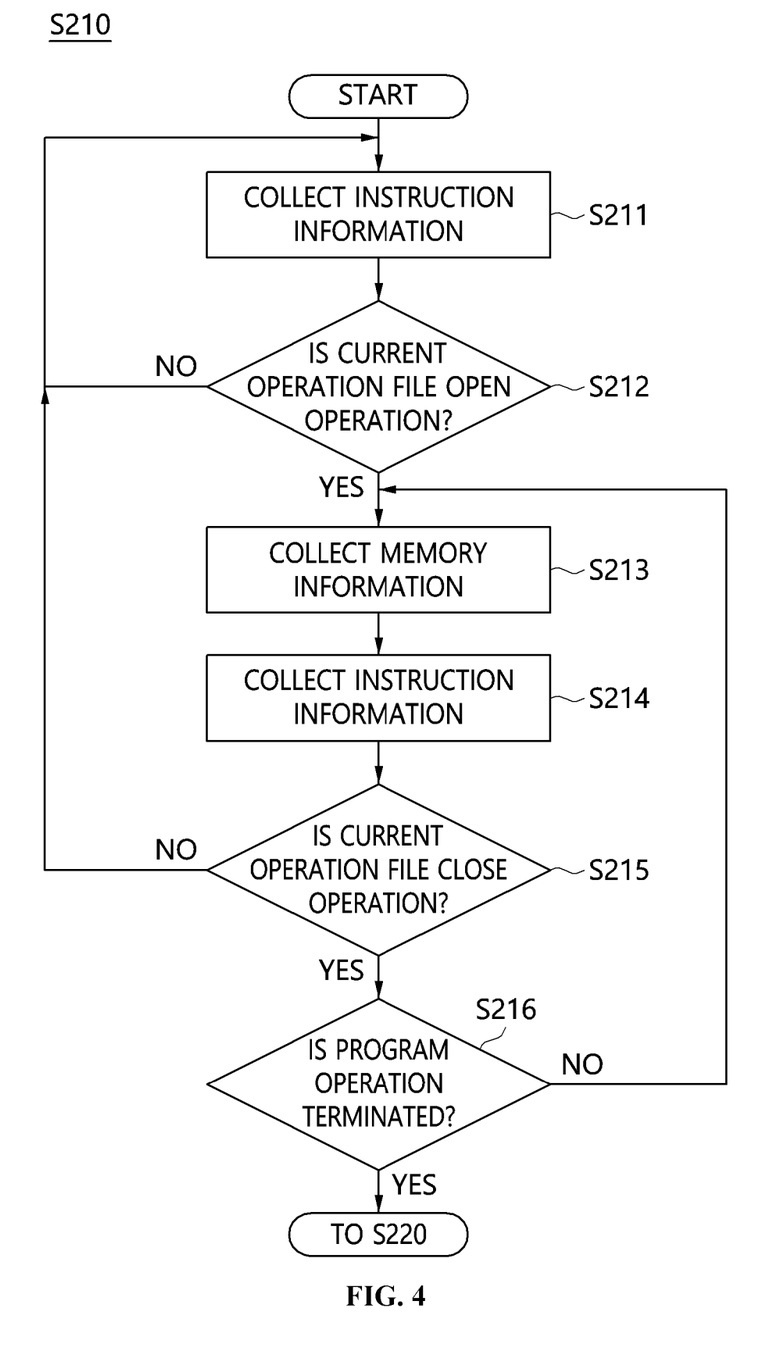
FIG. 4 is a flowchart specifically illustrating an example of the step of collecting memory information illustrated in FIG. 3.
Figure 5:
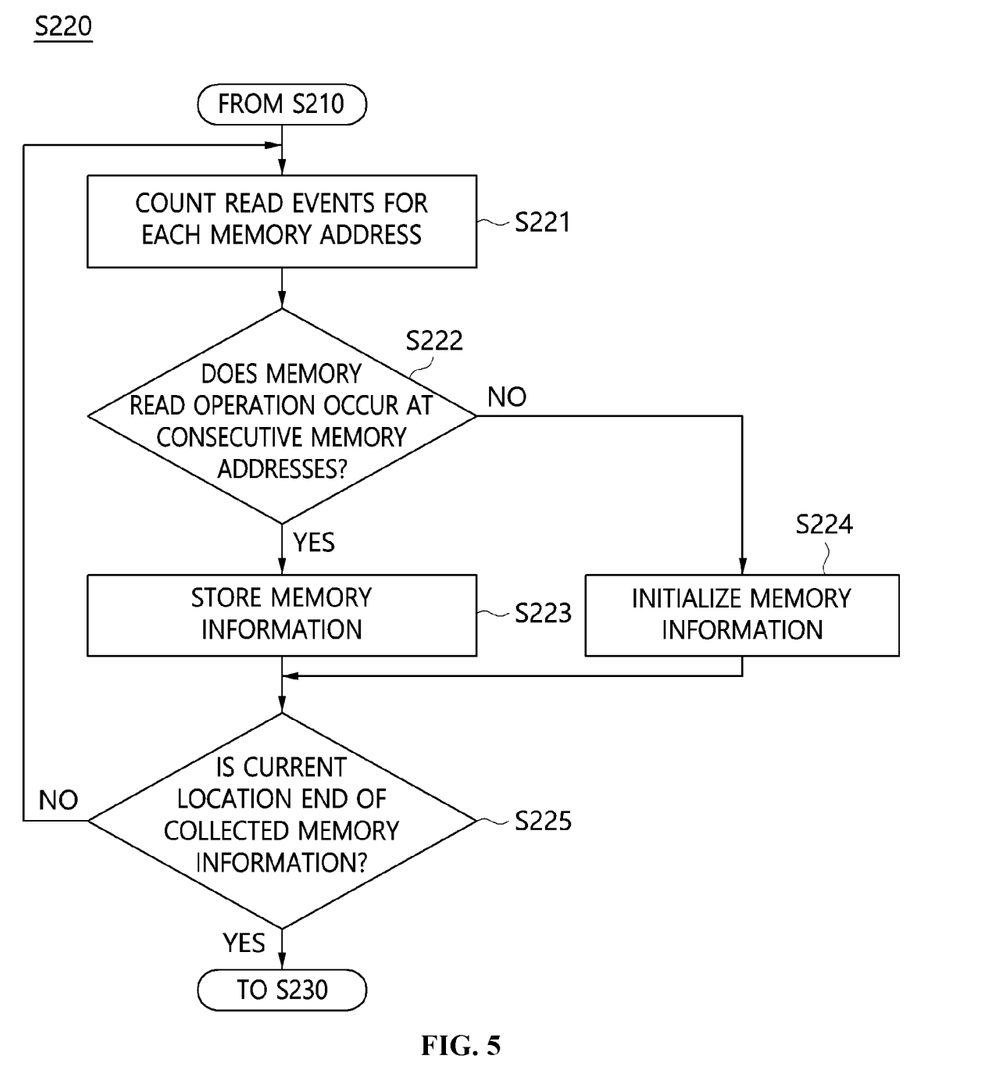
FIG. 5 is a flowchart specifically illustrating an example of the step of analyzing memory information illustrated in FIG. 3.

FIG. 3 is a flowchart illustrating a method for encryption key recovery based on memory analysis according to an embodiment of the present invention. FIG. 4 is a flowchart specifically illustrating an example of the step of collecting memory information illustrated in FIG. 3. FIG. 5 is a flowchart specifically illustrating an example of the step of analyzing memory information illustrated in FIG. 3.

Referring to FIG. 3, in the method for encryption key recovery based on memory analysis according to an embodiment of the present invention, first, memory information may be collected at step S210.

That is, at step S210, memory information pertaining to an encrypted part of a file in which ransomware is detected may be collected based on dynamic binary instrumentation.

Here, at step S210, the memory information of a section between the operation of opening the file and the operation of closing the file may be collected.

Referring to FIG. 4, at step S210, first, instruction information based on the execution of the file in which the ransomware is detected may be collected at step S211.

Here, when an instruction to open the file is identified in the collected instruction information at step S212, memory information pertaining to the file may be collected at step S213, whereas when an instruction to open the file is not identified, instruction information may be collected at step S211.

Here, at step S213, memory information based on the execution of the file in which the ransomware is detected may be collected.

Here, at step S214, instruction information based on the execution of the file in which the ransomware is detected may be collected.

Here, at step S215, instruction information based on the execution of the file in which the ransomware is detected is collected, and when an instruction to close the file is identified in the collected instruction information, whether the encryption operation by the ransomware is finished may be checked at step S216. When an instruction to close the file is not identified, instruction information may be continuously collected at step S211.

Here, when termination of the ransomware is identified at step S216, memory read operation data in the collected memory information may be analyzed at step S220, whereas when the ransomware is not terminated, memory information may be collected at step S213.

In the method for encryption key recovery based on memory analysis according to an embodiment of the present invention, the memory information may be analyzed at step S220.

That is, at step S220, in the memory information, memory read operation data corresponding to an encryption key that is used for encryption of the file may be analyzed.

Here, at step S220, a memory address at which a memory read operation occurs and memory read operation data acquired through the memory read operation may be extracted from the memory information.

Here, at step S220, the memory address and the memory read operation data may be repeatedly output.

Here, at step S220, the number of occurrences of each memory read operation in the memory information is counted, and the memory address at which the memory read operation occurs, the memory read operation data acquired through the memory read operation, and the number of occurrences of the memory read operation may be sequentially output.

Referring to FIG. 5, at step S220, first, the number of occurrences of the memory read operation occurring at the memory address may be counted at step S221.

Here, at step S222, when memory read operations occurring at consecutive memory addresses are found in the memory information, memory read operation data corresponding thereto is stored at step S223, whereas when the memory addresses at which the memory read operations occur are not consecutive, a part corresponding to the memory read operation data acquired through the memory read operations may be initialized in the memory information at step S224.

Here, when memory read operations occurring at consecutive memory addresses are found in the memory information, the memory read operation data acquired through the memory read operations may be extracted.

Here, at step S222, after the number of occurrences of the memory read operation occurring at each memory address in the memory information is counted, the memory address, the memory read operation data acquired through the memory read operation, and the number of occurrences may be sequentially output.

Here, at step S222, when the size of the memory read operation data acquired through the memory read operations occurring at the consecutive memory addresses is equal to or greater than a preset size, the memory read operation data may be extracted.

Here, the preset size may be 16 bytes, in accordance with AES-128.

Here, at step S222, a memory read operation data candidate group may be generated by including the memory read operation data acquired through the memory read operations occurring at the consecutive memory addresses when the corresponding memory read operation data is equal to or greater than the preset size and when the numbers of occurrences of the memory read operations at the consecutive memory addresses are equal to each other.

Here, at step S225, when analysis of all the memory read operation data is completed to the end of the memory information, the encryption key may be recovered at step S230, whereas when the analyzed part is not the end of the memory information, the number of occurrences of the memory read operation data at each memory address may be counted at step S221.

Also, in the method for encryption key recovery based on memory analysis according to an embodiment of the present invention, the result of recovery of the encryption key may be output at step S230.

That is, at step S230, the encryption key may be recovered based on the result of analysis of the memory read operation data, and the result of recovery of the encryption key may be output.

Here, at step S230, an encryption key candidate group, in which the memory read operation data is sorted according to the number of occurrences of the memory read operation through which the memory read operation data is acquired, may be generated from the memory read operation data candidate group, and the encryption key may be recovered based on the encryption key candidate group.

Here, at step S230, the encryption key candidate group, in which the memory read operation data acquired through each of the memory read operations occurring the same number of times at the consecutive memory addresses is sorted, may be output.

Here, at step S230, the encryption key candidate group may be output by sequentially outputting the memory address, the memory read operation data, and the number of occurrences of the memory read operation.

Figure 6:
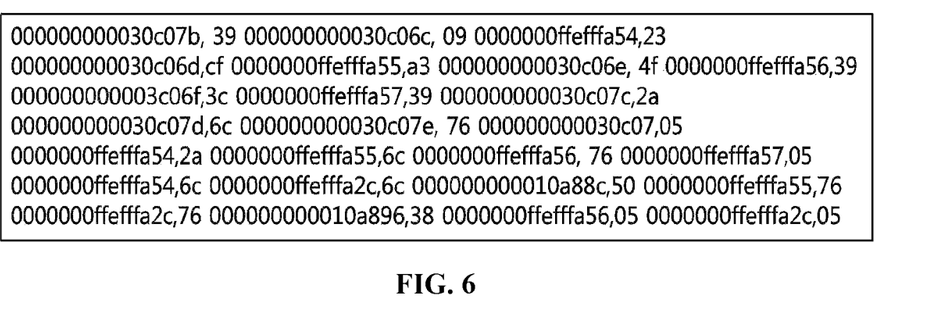
FIG. 6 is a view illustrating the result of extraction of memory read operation data according to an embodiment of the present invention.

FIG. 6 is a view illustrating the result of extraction of memory read operation data according to an embodiment of the present invention.

Referring to FIG. 6, memory information is output by repeatedly outputting a memory address and memory read operation data in the order in which they are listed.

Figure 7:
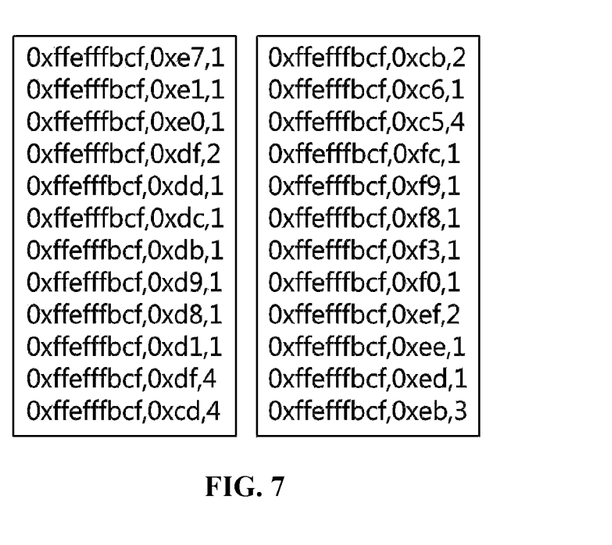
FIG. 7 is a view illustrating an extraction result acquired by counting the number of occurrences of a memory read operation at a memory address according to an embodiment of the present invention.

FIG. 7 is a view illustrating an extraction result acquired by counting the number of occurrences of a memory read operation at a memory address according to an embodiment of the present invention.

Referring to FIG. 7, the number of occurrences of a memory read operation at a memory address is counted, and the memory address at which the memory read operation occurs, the memory read operation data acquired through the memory read operation, and the number of occurrences are sequentially output.

Figure 8:
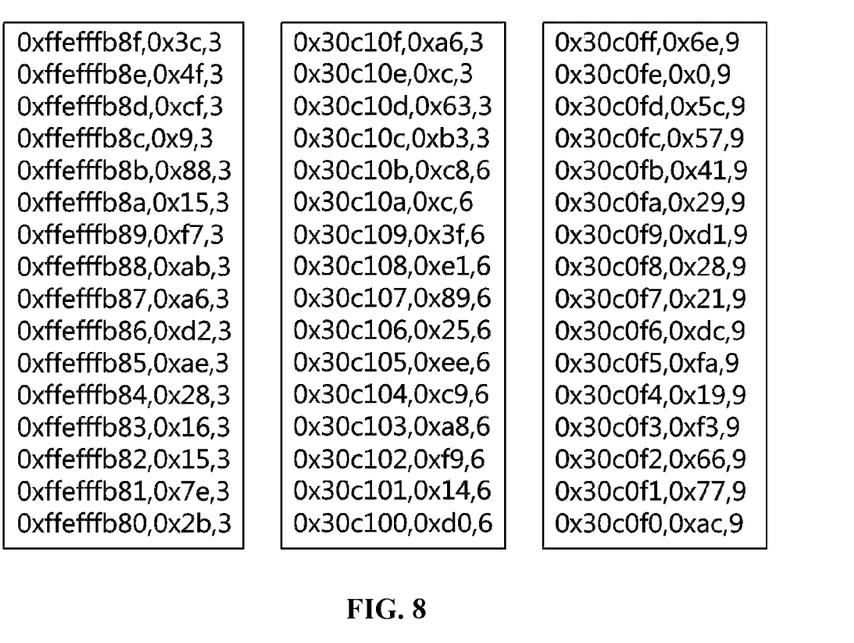
FIG. 8 is a view illustrating the result of extraction of memory read operation data that is acquired by memory read operations occurring at consecutive memory addresses and that has a size equal to or greater than a preset size according to an embodiment of the present invention.

FIG. 8 is a view illustrating the result of extraction of memory read operation data that is acquired through memory read operations occurring at consecutive memory addresses and that has a size equal to or greater than a preset size according to an embodiment of the present invention.

Referring to FIG. 8, an encryption key candidate group in which the memory read operation data is sorted according to the number of occurrences of the memory read operation through which the memory read operation data is acquired is illustrated.

Figure 9:
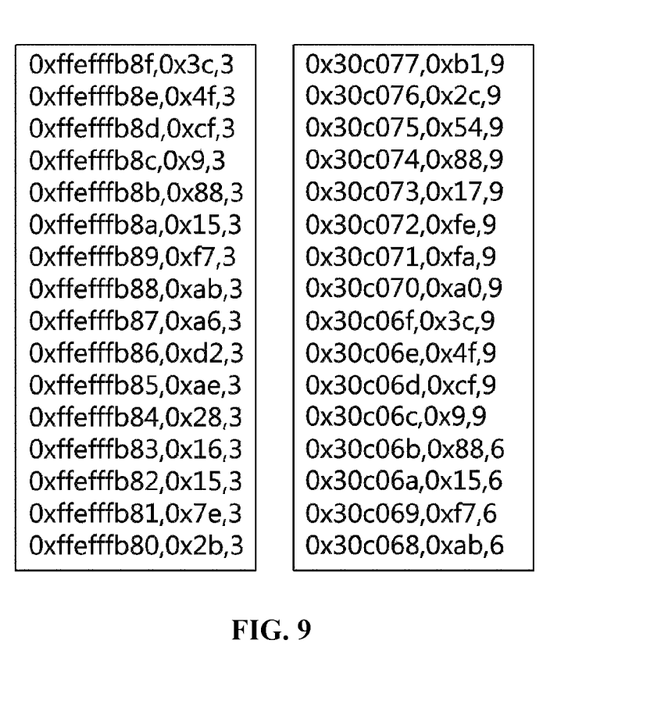
FIG. 9 is a view illustrating an analyzed encryption master key candidate group and an analyzed round key candidate group according to an embodiment of the present invention.

FIG. 9 is a view illustrating an analyzed encryption master key candidate group and an analyzed round key candidate group according to an embodiment of the present invention.

Referring to FIG. 9, the encryption master key candidate group and the round key candidate group, in each of which a memory address, memory read operation data, and the number of occurrences of a memory read operation are sequentially listed, are output.

Here, the candidate group including memory read operation data that is acquired through a memory read operation occurring three times in the memory information is generated as the encryption master key candidate group, and the candidate group including memory read operation data that is acquired through a memory read operation occurring nine times in the memory information is generated as the round key candidate group.

Figure 10:
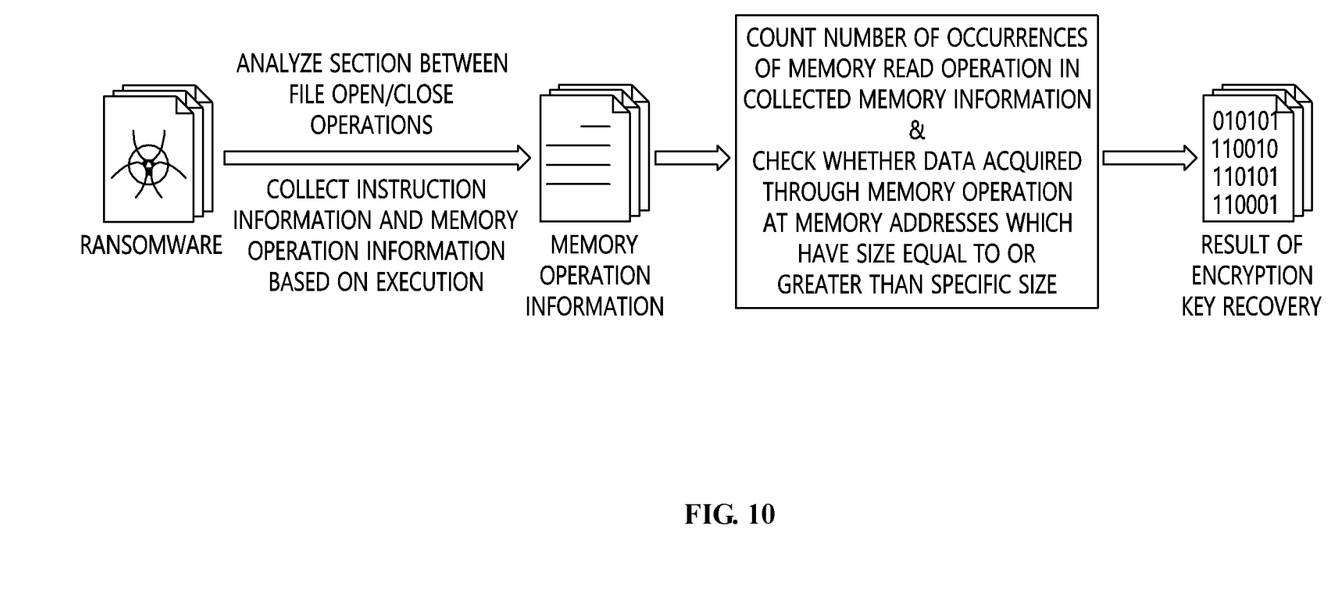
FIG. 10 is a view illustrating the process of recovering an encryption key based on memory analysis according to an embodiment of the present invention.

FIG. 10 is a view illustrating the process of encryption key recovery based on memory analysis according to an embodiment of the present invention.

Referring to FIG. 10, in the process of recovering an encryption key based on memory analysis according to an embodiment of the present invention, first, the apparatus 100 for encryption key recovery based on memory analysis may collect memory information from a file in which ransomware is detected based on dynamic binary instrumentation.

Here, the apparatus 100 for encryption key recovery based on memory analysis may identify file open/close operations by collecting instruction information based on the execution of the file in which the ransomware is detected, and may collect memory information between the file open operation and the file close operation.

Also, the apparatus 100 for encryption key recovery based on memory analysis may count the number of occurrences of a memory read operation at each memory address in the memory information, and may extract memory read operation data having a size equal to or greater than a preset size, which is acquired through memory read operations occurring at consecutive memory addresses.

Also, the apparatus 100 for encryption key recovery based on memory analysis may output an encryption key candidate group, in which memory read operation data acquired through each of memory read operations occurring the same number of times at consecutive memory addresses is sorted according to the number of occurrences, and may recover the encryption key based on the encryption key candidate group.

Figure 11:
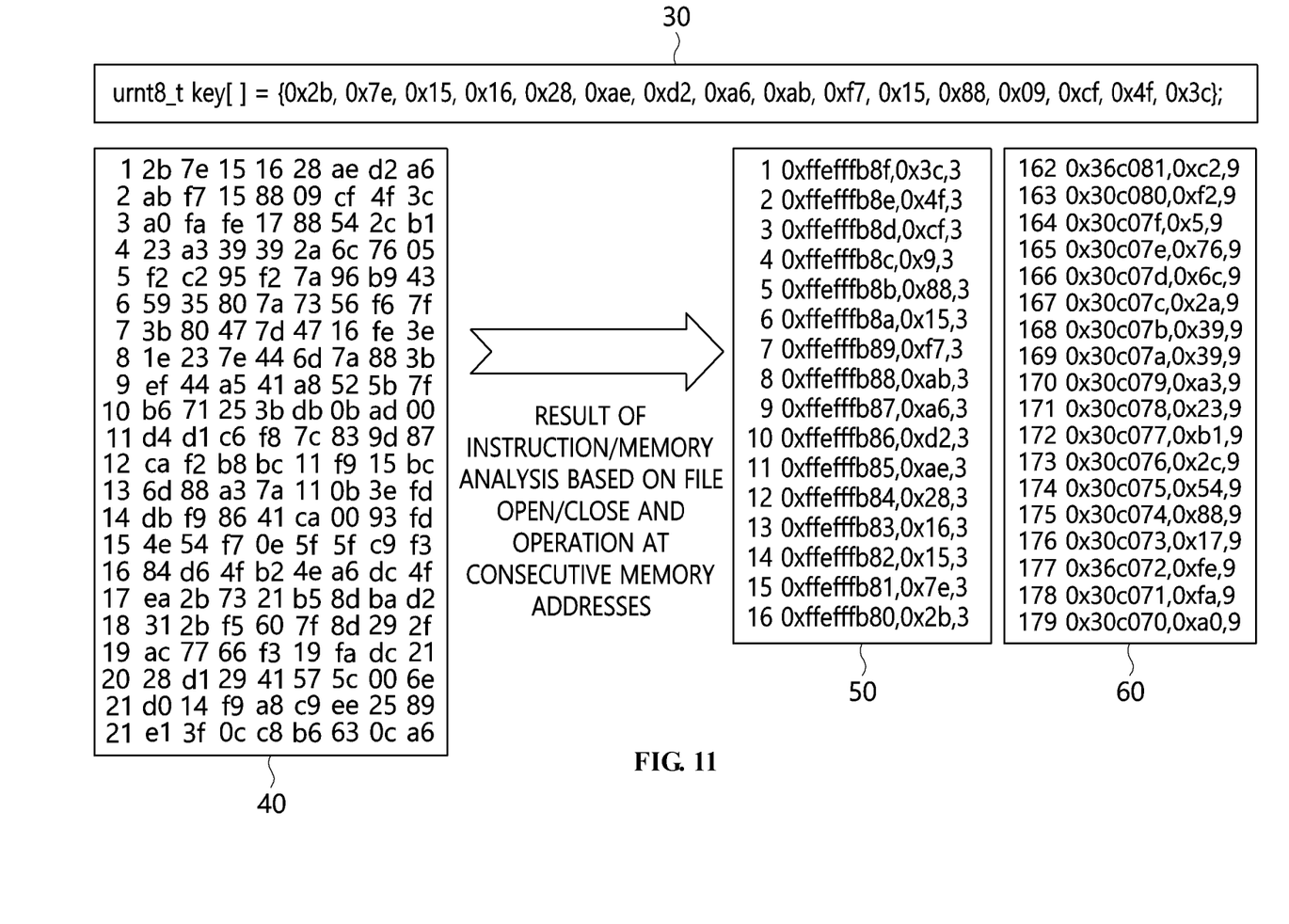
FIG. 11 is a view illustrating the result of recovery of an encryption master key and a round key according to an embodiment of the present invention.

FIG. 11 is a view illustrating the result of recovery of an encryption master key and a round key according to an embodiment of the present invention.

Referring to FIG. 11, an encryption master key 30 used for file encryption and a round key 40 used for file encryption are illustrated.

Here, an encryption master key candidate group 50 and a round key candidate group 60 recovered based on an analysis result are illustrated. Here, the analysis result may be acquired in such a way that the apparatus 100 for encryption key recovery based on memory analysis according to an embodiment of the present invention collects memory information between file open/close operations and analyzes memory read operation data acquired through memory read operations that occur the same number of times at consecutive memory addresses.

Figure 12:
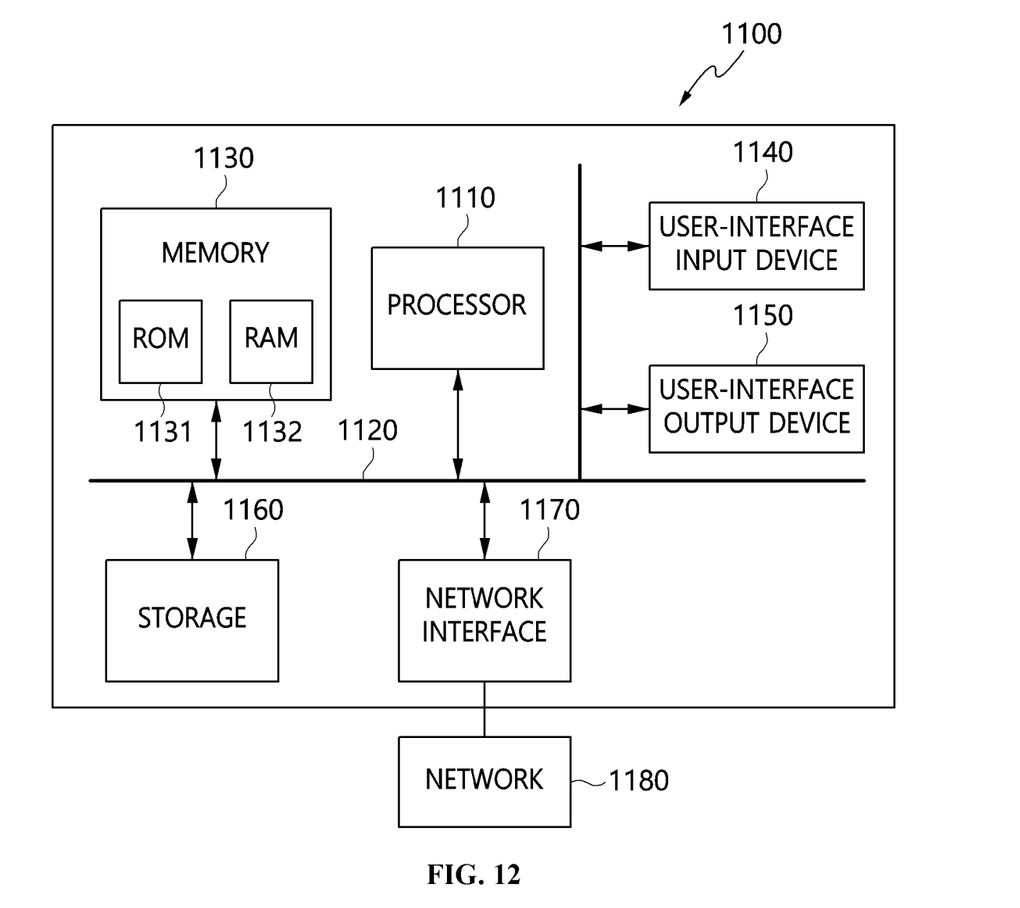
FIG. 12 is a view illustrating a computer system according to an embodiment of the present invention.

FIG. 12 is a view illustrating a computer system according to an embodiment of the present invention.

Referring to FIG. 12, the apparatus 100 for encryption key recovery based on memory analysis according to an embodiment of the present invention may be implemented in a computer system 1100 including a computer-readable recording medium. As illustrated in FIG. 12, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus 100 for encryption key recovery based on memory analysis according to an embodiment of the present invention includes one or more processors 1110 and executable memory 1130 for storing at least one program executed by the one or more processors 1110. The at least one program may collect memory information pertaining to an encrypted part of a file, in which ransomware is detected, based on dynamic binary instrumentation, analyze memory read operation data corresponding to an encryption key that is used for encryption of the file in the memory information, recover the encryption key based on the result of analysis of the memory read operation data, and output the result of recovery of the encryption key.

Here, the at least one program may collect the memory information of a section between the operation of opening the file and the operation of closing the file.

Here, the at least one program may extract a memory address at which a memory read operation occurs and memory read operation data corresponding thereto from the memory information.

Here, the at least one program may count the number of occurrences of the memory read operation at the memory address.

Here, when memory read operations occur at consecutive memory addresses, the at least one program may extract memory read operation data, acquired through the memory read operations occurring at the consecutive memory addresses, from the memory information.

Here, when the size of the memory read operation data acquired through the memory read operations occurring at the consecutive memory addresses is equal to or greater than a preset size, the at least one program extracts the memory read operation data.

Here, the at least one program may generate a memory read operation data candidate group by including the memory read operation data acquired through the memory read operations occurring at the consecutive memory addresses when the size of the corresponding memory read operation data is equal to or greater than the preset size and when the numbers of occurrences of the memory read operations at the consecutive memory addresses are equal to each other.

Here, the at least one program may generate an encryption key candidate group, in which the memory read operation data is sorted according to the number of occurrences of the memory read operation through which the memory read operation data is acquired, based on the memory read operation data candidate group, and may recover the encryption key based on the encryption key candidate group.

The present invention may provide an apparatus and method for recovering an encryption key and minimizing material and monetary damage incurred by false positives or false negatives in detection of ransomware.

As described above, the apparatus and method for encryption key recovery based on memory analysis according to the present invention are not limitedly applied to the configurations and operations of the above-described embodiments, but all or some of the embodiments may be selectively combined and configured, so the embodiments may be modified in various ways.

What is claimed is:

1. An apparatus for encryption key recovery based on memory analysis, comprising:
    one or more processors; and
    executable memory for storing at least one program executed by the one or more processors,
    wherein the at least one program
    collects memory information pertaining to an encrypted part of a file, in which ransomware is detected, based on dynamic binary instrumentation,
    analyzes memory read operation data corresponding to an encryption key that is used for encryption of the file from the memory information, by extracting from the memory information a memory address at which a memory read operation occurs, and memory read operation data corresponding to the memory read operation, and counting a number of occurrences of the memory read operation data at the memory address,
    generates an encryption key candidate group in which the memory read operation data acquired through the memory read operation is sorted according to a number of occurrences of the memory read operation data,
    recovers the encryption key based on a result of the analysis of the memory read operation data, and
    outputs a result of the recovery of the encryption key.

2. The apparatus of claim 1, wherein the at least one program collects the memory information of a section between an operation of opening the file and an operation of closing the file.

3. The apparatus of claim 1, wherein, when memory read operations occur at consecutive memory addresses, the at least one program extracts memory read operation data, acquired through the memory read operations occurring at the consecutive memory addresses, from the memory information.

4. The apparatus of claim 3, wherein, when a size of the memory read operation data acquired through the memory read operations occurring at the consecutive memory addresses is equal to or greater than a preset size, the at least one program extracts the memory read operation data.

5. The apparatus of claim 4, wherein the at least one program generates a memory read operation data candidate group by including the memory read operation data acquired through the memory read operations occurring at the consecutive memory addresses when a size of the memory read operation data is equal to or greater than the preset size and when numbers of occurrences of the memory read operations at the consecutive memory addresses are equal to each other.

6. The apparatus of claim 5, wherein the at least one program
    generates an encryption key candidate group, in which the memory read operation data acquired through the memory read operation is sorted according to a number of occurrences of the memory read operation data, from the memory read operation data candidate group, and
    recovers the encryption key based on the encryption key candidate group.

7. A method for encryption key recovery based on memory analysis, performed by an apparatus for encryption key recovery based on memory analysis, the method comprising:
    collecting memory information pertaining to an encrypted part of a file, in which ransomware is detected, based on dynamic binary instrumentation;
    analyzing memory read operation data, corresponding to an encryption key that is used for encryption of the file, from the memory information by extracting from the memory information a memory address at which a memory read operation occurs, and memory read operation data corresponding to the memory read operation, and counting a number of occurrences of the memory read operation data at the memory address;
    generating an encryption key candidate group in which the memory read operation data acquired through the memory read operation is sorted according to a number of occurrences of the memory read operation data; and
    recovering the encryption key based on a result of the analysis of the memory read operation data, and outputting a result of the recovery of the encryption key.

8. The method of claim 7, wherein the collecting comprises collecting the memory information of a section between an operation of opening the file and an operation of closing the file.

9. The method of claim 7, wherein the analyzing comprises, when memory read operations occur at consecutive memory addresses, extracting memory read operation data, acquired through the memory read operations occurring at the consecutive memory addresses, from the memory information.

10. The method of claim 9, wherein the analyzing comprises extracting the memory read operation data acquired through the memory read operations occurring at the consecutive memory addresses when a size of the memory read operation data is equal to or greater than a preset size.

11. The method of claim 10, wherein the analyzing comprises generating a memory read operation data candidate group by including the memory read operation data acquired through the memory read operations occurring at the consecutive memory addresses when a size of the memory read operation data is equal to or greater than the preset size and when numbers of occurrences of the memory read operations at the consecutive memory addresses are equal to each other.

12. The method of claim 11, wherein the outputting comprises
- generating an encryption key candidate group, in which the memory read operation data acquired through the memory read operation is sorted according to a number of occurrences of the memory read operation data, from the memory read operation data candidate group, and
- recovering the encryption key based on the encryption key candidate group.

13. An apparatus for encryption key recovery based on memory analysis, comprising:
- one or more processors; and
- executable memory for storing at least one program executed by the one or more processors,
- wherein the at least one program
- collects memory information pertaining to an encrypted part of a file, in which ransomware is detected, based on dynamic binary instrumentation,
- analyzes memory read operation data corresponding to an encryption key that is used for encryption of the file from the memory information, by extracting from the memory information a memory address at which a memory read operation occurs, and memory read operation data corresponding to the memory read operation, and counting a number of occurrences of the memory read operation data at the memory address,
- recovers the encryption key when the analysis of the memory read operation data is completed to the end of the memory information,
- counts the number of occurrences of the memory read operation at each memory address when the analysis of the memory read operation data is not completed to the end of the memory information, and
- outputs a result of the recovery of the encryption key, by generating an encryption key candidate group, in which the memory read operation data acquired through the memory read operation is sorted according to the number of occurrences of the memory read operation data, and recovering the encryption key based on the encryption key candidate group.

* * * * *